US012429097B2

(12) United States Patent
Lee

(10) Patent No.: US 12,429,097 B2
(45) Date of Patent: Sep. 30, 2025

(54) AXLE DISCONNECT CLUTCH

(71) Applicant: Schaeffler Technologies AG & Co. KG, Herzogenaurach (DE)

(72) Inventor: Brian Lee, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 694 days.

(21) Appl. No.: 17/868,854

(22) Filed: Jul. 20, 2022

(65) Prior Publication Data

US 2024/0025207 A1 Jan. 25, 2024

(51) Int. Cl.

*F16D 11/10* (2006.01)
*B60B 35/12* (2006.01)
*B60B 35/14* (2006.01)
*F16D 23/14* (2006.01)
*F16D 11/00* (2006.01)
*F16D 23/12* (2006.01)

(52) U.S. Cl.

CPC ............ *F16D 11/10* (2013.01); *B60B 35/128* (2013.01); *B60B 35/14* (2013.01); *F16D 23/14* (2013.01); *B60B 2380/12* (2013.01); *F16D 2011/004* (2013.01); *F16D 2023/123* (2013.01)

(58) Field of Classification Search

CPC ....... B60B 35/128; B60B 35/14; B60B 35/18; F16D 11/10; F16D 2011/004; F16D 23/14; F16D 2023/123

See application file for complete search history.

(56) References Cited

U.S. PATENT DOCUMENTS 4,343,386 A * 8/1982 Schaefer ................ F16D 11/14 192/93 R
5,485,904 A * 1/1996 Organek ................ F16D 47/04 192/84.1
5,651,437 A * 7/1997 Organek .............. F16D 27/112 192/93 A
5,806,623 A * 9/1998 Clohessy ............... F16D 11/14 192/3.59
7,022,020 B2 4/2006 Watanabe et al.
2002/0187874 A1* 12/2002 Kazaoka ............... B60K 17/35 180/247
2014/0335992 A1* 11/2014 Lee ........................ F16H 48/24 475/248
2016/0356324 A1* 12/2016 Severinsson ........... F16D 41/00
(Continued)

FOREIGN PATENT DOCUMENTS

DE 102017210972 A1 * 1/2019
DE 102021126151 A1 * 4/2023 .............. B60K 1/00

*Primary Examiner* — Timothy Hannon

(57) ABSTRACT

An axle disconnect clutch includes an axle shaft, a tulip for a constant velocity joint, and a sliding sleeve. The sliding sleeve includes a first inner spline and a first outer spline, radially aligned with the first inner spline. One of the axle shaft or the tulip includes a second inner spline, and the other one includes a second outer spline. The sliding sleeve is axially slidable along a one of the first inner spline or the first outer spline to engage the other of the first inner spline or the first outer spline with the second outer spline or the second inner spline, respectively, rotationally connecting the axle shaft and the tulip. In an example embodiment, the sliding sleeve has an undulating profile, and a number of inner spline teeth of the first inner spline is equal to a number of outer spline teeth of the first outer spline.

15 Claims, 4 Drawing Sheets

128 150 132 126 100 158 152 156 144 142 106 146 130 102 118 122 148 134 114 178 138 110 112 136 120 104 182 108 186 180

(56) References Cited

U.S. PATENT DOCUMENTS

| | | | | |
|---|---|---|---|---|
| 2018/0080508 | A1* | 3/2018 | Nahrwold | F16D 15/00 |
| 2018/0106301 | A1* | 4/2018 | Moubarak | F16D 21/06 |
| 2020/0164743 | A1* | 5/2020 | Frenznick | F16H 48/05 |
| 2022/0154778 | A1 | 5/2022 | Lee | |

* cited by examiner

AXLE DISCONNECT CLUTCH

TECHNICAL FIELD

The present disclosure relates generally to a disconnect clutch, and more specifically to an axle disconnect clutch.

BACKGROUND

Axle disconnect clutches are known. One example is shown and described in commonly-assigned United States Patent Application Publication No. 2022/0154778 titled AXLE DISCONNECT ASSEMBLY.

SUMMARY

Example embodiment broadly comprise an axle disconnect clutch including an axle shaft, a tulip for a constant velocity joint, and a sliding sleeve. The sliding sleeve includes a first inner spline and a first outer spline, radially aligned with the first inner spline. A one of the axle shaft or the tulip includes a second inner spline, complementary to the first outer spline, and the other one of the axle shaft or the tulip includes a second outer spline, complementary to the first inner spline. The sliding sleeve is axially slidable along a one of the first inner spline or the first outer spline to engage the other of the first inner spline or the first outer spline with the second outer spline or the second inner spline, respectively, rotationally connecting the axle shaft and the tulip. In an example embodiment, the sliding sleeve has an undulating profile, and a number of inner spline teeth of the first inner spline is equal to a number of outer spline teeth of the first outer spline.

In some example embodiments, the axle disconnect clutch includes a resilient element. The sliding sleeve is axially slidable in a first axial direction to rotationally connect the axle shaft and the tulip, and the resilient element is arranged to urge the sliding sleeve in a second axial direction, opposite the first axial direction, to rotationally disconnect the axle shaft and the tulip. In some example embodiments, the axle disconnect clutch includes a bearing disposed axially between the sliding sleeve and the resilient element. In some example embodiments, the sliding sleeve has a stepped portion and the bearing is disposed on a radially outer side of the stepped portion. In an example embodiment, the axle disconnect clutch has a nonferrous target for a proximity sensor with a cylindrical protrusion arranged on a radially inner side of the stepped portion.

In some example embodiments, the axle disconnect clutch has a bearing disposed radially between the axle shaft and the tulip such that the tulip is supported on the axle shaft. In an example embodiment, the axle disconnect clutch has a seal that seals the axle shaft to the tulip. In an example embodiment, the axle disconnect clutch has a housing and a bearing disposed radially between the axle shaft and the housing.

In some example embodiments, the axle disconnect clutch has a ball ramp assembly for axially sliding the sliding sleeve in a first axial direction to rotationally connect the axle shaft and the tulip. In some example embodiments, the ball ramp assembly includes a first axially outer ramp plate with a first ball ramp, a second axially outer ramp plate with a second ball ramp, a central plate with a third ball ramp facing the first ball ramp and a fourth ball ramp facing the second ball ramp, a first ball displaceable along a first channel formed by the first ball ramp and the third ball ramp, and a second ball displaceable along a second channel formed by the second ball ramp and the fourth ball ramp. In an example embodiment, the axle disconnect clutch has a first ball guide disposed axially between the first axially outer ramp plate and the central plate, and a second ball guide disposed axially between the second axially outer ramp plate and the central plate. In an example embodiment, at least one of the first ball ramp, the second ball ramp, the third ball ramp or the fourth ball ramp has an indentation at an end of the respective ball ramp for receiving the first ball or the second ball.

In some example embodiments, the axle disconnect clutch has a housing. Each of the first axially outer ramp plate and the second axially outer ramp plate is rotationally fixed to the housing, and the central plate is rotatable relative to the housing. In some example embodiments, the axle disconnect clutch has an electric motor arranged to rotate the central plate to axially displace the sliding sleeve. In an example embodiment, the electric motor is fixed to the housing. In an example embodiment, the axle disconnect clutch has an idler gear. The central plate has an outer gear engaged with the idler gear, and the electric motor has a pinion gear engaged with the idler gear.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
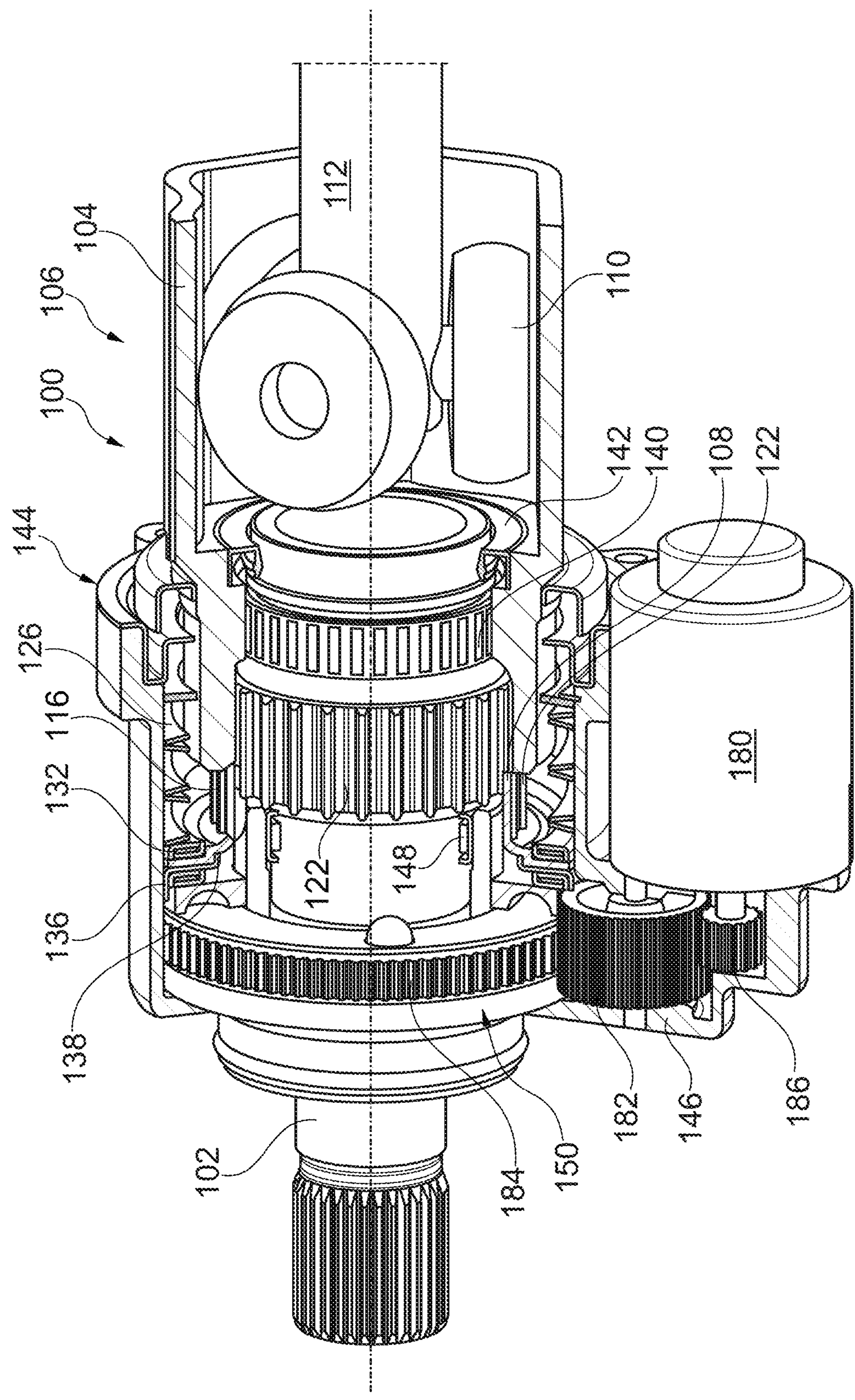
FIG. 1 illustrates a cutaway perspective view of an axle disconnect clutch according to an example embodiment.
Figure 2:
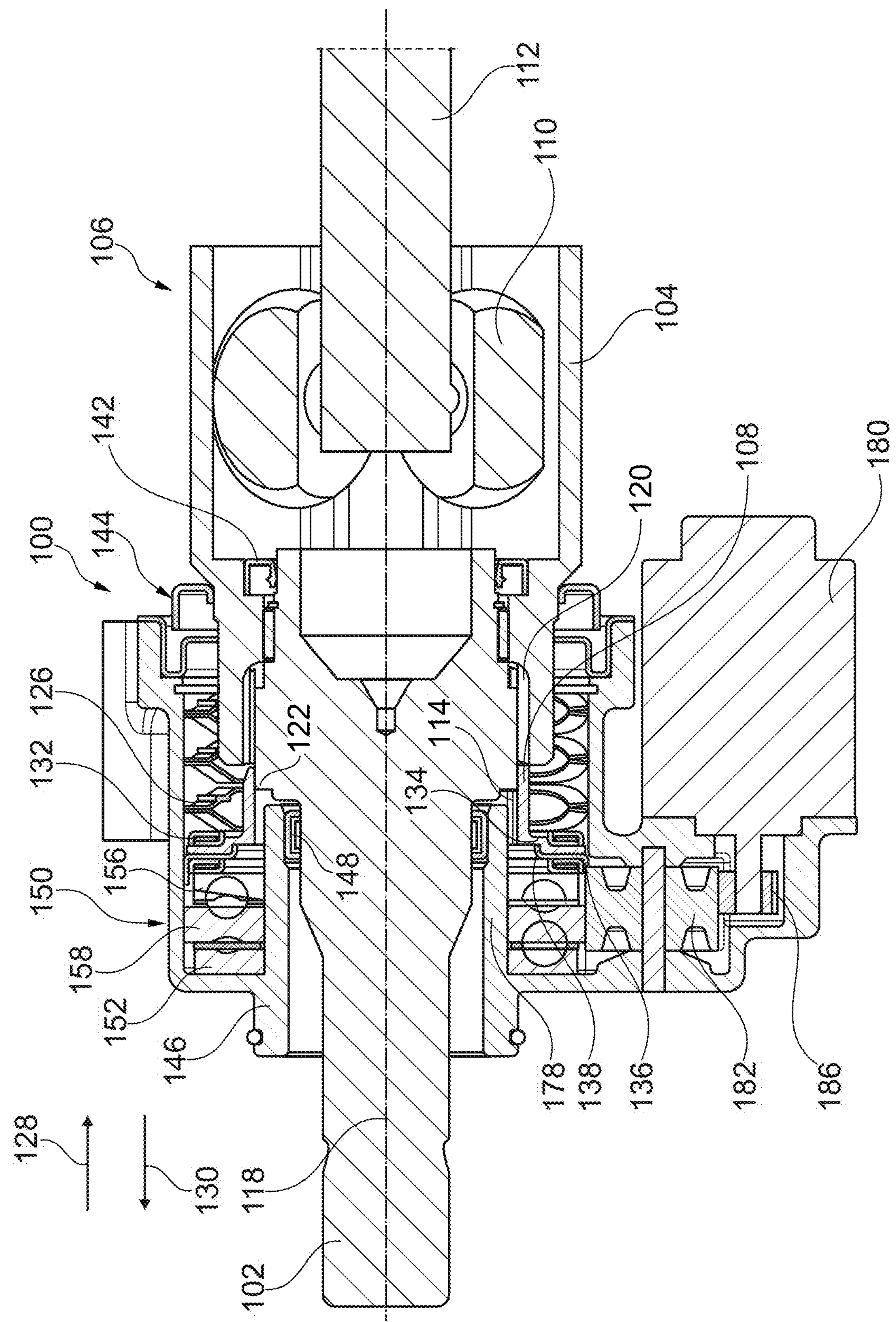
FIG. 2 illustrates a cross-sectional view of the axle disconnect clutch of FIG. 1 shown in a disengaged position.
Figure 3:
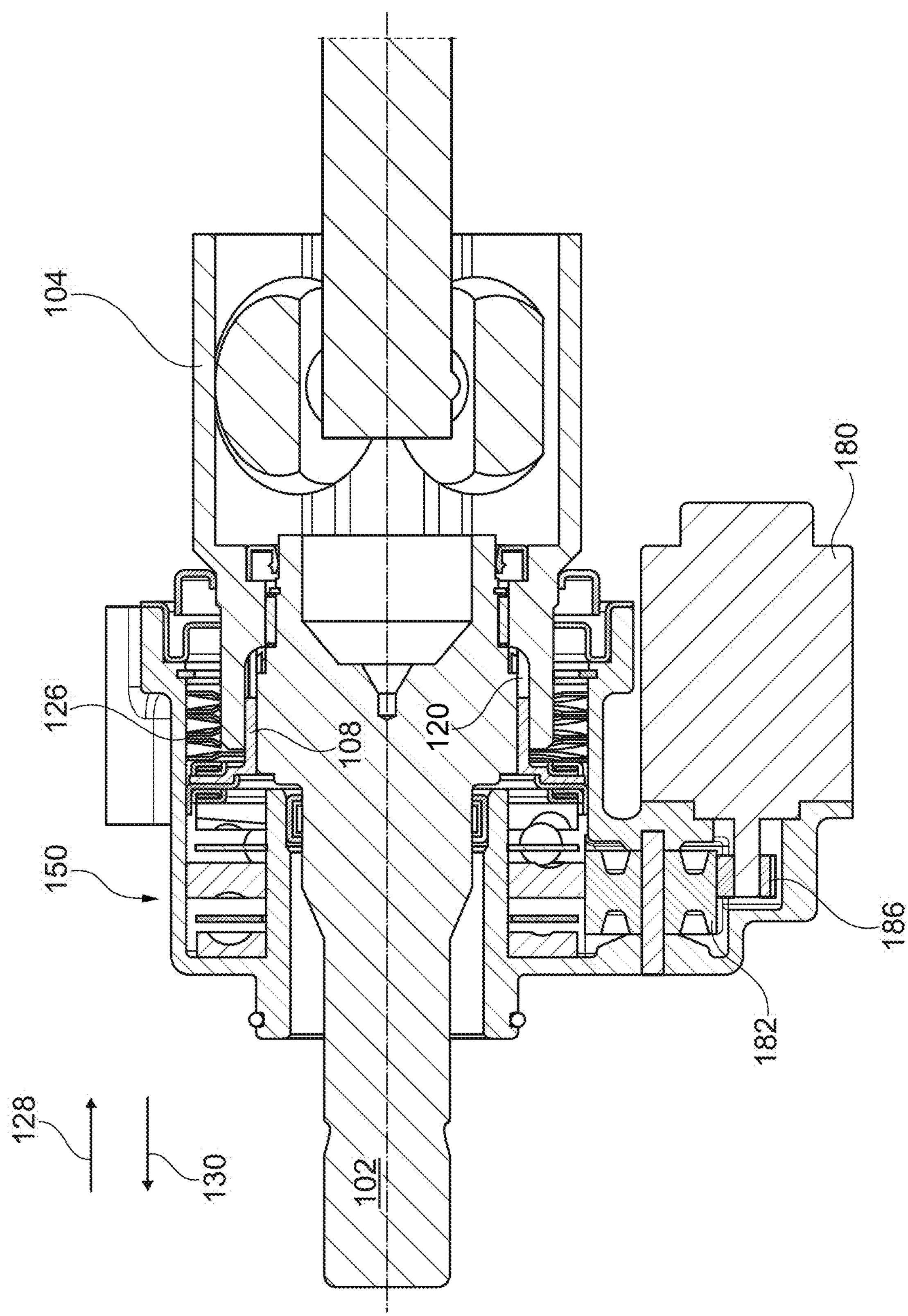
FIG. 3 illustrates cross-sectional view of the axle disconnect clutch of FIG. 1 shown in an engaged position.

The following description is made with reference to FIGS. 1-3. FIG. 1 illustrates a cutaway perspective view of axle disconnect clutch 100 according to an example embodiment. FIG. 2 illustrates a cross-sectional view of axle disconnect clutch 100 of FIG. 1 shown in a disengaged position. FIG. 3 illustrates cross-sectional view of axle disconnect clutch 100 of FIG. 1 shown in an engaged position. Axle disconnect clutch 100 includes axle shaft 102, tulip 104 for constant velocity joint 106, and sliding sleeve 108. By tulip, I mean a housing part of a constant velocity (CV) joint that receives rolling elements 110 for driving output shaft 112. It may be referred to as a tulip due to the shape of the housing part when viewed from an end where the rolling elements are inserted. CV joints are known in the art and an example is shown and described in U.S. Pat. No. 7,022,020 titled TRIPOD CONSTANT VELOCITY UNIVERSAL JOINT to Watanabe et al.

The sliding sleeve includes inner spline 114 and outer spline 116, radially aligned with inner spline 114. By radially aligned, I mean that a radial line drawn from axis 118 of the axle disconnect clutch passed through a portion of inner spline 114 and outer spline 116. As shown in the figures, the tulip includes inner spline 120, complementary to outer spline 116, and the axle shaft includes outer spline 122, complementary to inner spline 114. Although the tulip is shown with an inner spline and the axle shaft is shown with an outer spline, other embodiments (not shown) may have a tulip with an outer spline and an axle shaft with an inner spline.

As shown in FIGS. 2-3, for example, the sliding sleeve is axially slidable along outer spline 122 to engage outer spline 116 with inner spline 120, rotationally connecting the axle shaft and the tulip. In other words, because the sliding sleeve is already engaged with outer spline 122, the sliding sleeve can move axially with inner spline 114 engaged with outer spline 122 until outer spline 116 is engaged with inner spline 120 to connect the axle shaft to the tulip. In other words, the sliding sleeve provides a link between splines 120 and 122 when slid to the right in FIGS. 2-3, but the link between splines 116 and 120 is removed when the sliding sleeve is slid to the left. Although the sleeve is shown initially engaged with outer spline 122, other embodiments (not shown) may have the sleeve initially engaged with inner spline 120 before engaging outer spline 122. Sliding sleeve 108 includes undulating profile 124 and a number of inner spline teeth of inner spline 114 is equal to a number of outer spline teeth of outer spline 116. A sliding sleeve of this design may be formed as a deep drawn stamping, for example.

Axle disconnect clutch 100 includes resilient element 126. The resilient element is shown as a stack of wave springs, but the resilient element may have other forms. For example, the resilient element may be a coil spring, a diaphragm spring, or a compressible rubber cylinder for example. The sliding sleeve is axially slidable in axial direction 128 (to the right in FIGS. 2-3) to rotationally connect the axle shaft and the tulip, and the resilient element is arranged to urge the sliding sleeve in axial direction 130 (to the left in FIGS. 2-3), opposite axial direction 128, to rotationally disconnect the axle shaft and the tulip.

Axle disconnect clutch 100 also includes bearing 132 disposed axially between the sliding sleeve and the resilient element. Sliding sleeve 108 includes stepped portion 134 and the bearing is disposed on a radially outer side of the stepped portion. Axle disconnect clutch 100 also includes nonferrous target 136 for a proximity sensor (not shown) with cylindrical protrusion 138 arranged on a radially inner side of the stepped portion. By nonferrous, I mean that the target may be made of aluminum or stainless steel, for example. The target may be used to detect an axial position of the sliding sleeve to determine whether the axle disconnect clutch is engaged (axle shaft connected to tulip) or disengaged (axle shaft disconnected from tulip).

Also disconnect clutch 100 also includes bearing 140, disposed radially between the axle shaft and the tulip such that the tulip is supported on the axle shaft, and seal 142 that seals the axle shaft to the tulip. Labyrinth seal 144 is arranged between the tulip and housing 146 to limit debris that may hinder operation of the axle disconnect clutch. Axle disconnect clutch 100 also includes housing 146 and bearing 148 disposed radially between the axle shaft and the housing.

Figure 4:
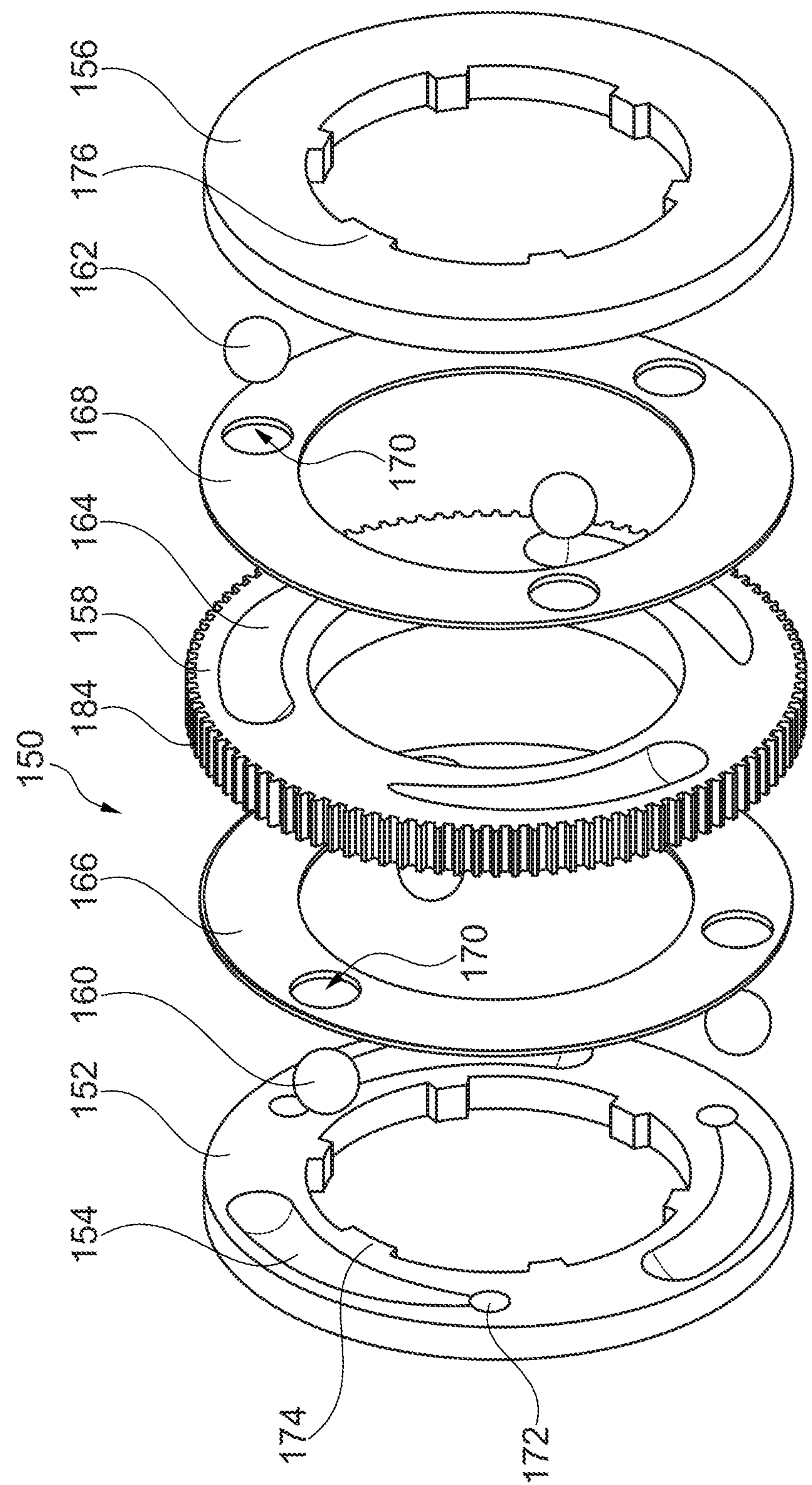
FIG. 4 illustrates a perspective exploded view of a ball ramp assembly for the axle disconnect clutch of FIG. 1.

The following description is made with reference to FIGS. 1-4. FIG. 4 illustrates a perspective exploded view of ball ramp assembly 150 for axle disconnect clutch 100. Axle disconnect clutch 100 includes ball ramp assembly 150 for axially sliding the sliding sleeve in axial direction 128 to rotationally connect the axle shaft and the tulip. Ball ramp assembly 150 includes axially outer ramp plate 152 with ball ramp 154, axially outer ramp plate 156 with a ball ramp (not shown), central plate 158 and balls 160 and 162. The central plate includes a ball ramp (not shown) facing ball ramp 154 and ball ramp 164 facing the ball ramp of plate 156. Ball 160 is displaceable along a first channel formed by ball ramp 154 and the ball ramp (not shown) of the central plate, and ball 162 is displaceable along a second channel formed by the ball ramp of plate 156 and ball ramp 164.

Axle disconnect clutch 100 includes ball guide 166 disposed axially between axially outer ramp plate 152 and the central plate, and ball guide 168 disposed axially between the axially outer ramp plate 156 and the central plate. As can be seen in FIG. 4, for example, the ball guides include apertures 170 for positioning the balls and keep them circumferentially distributed. In the example shown, ball ramp assembly includes a total of six balls, three between plates 152 and 158, and three between plates 156 and 158, although other numbers of balls are possible. Furthermore, other embodiments (not shown) may only include plates 152 and 158, and balls 160, for example.

As shown in FIG. 4, ball ramp 154 extends deeper into plate 152 in a clockwise direction, and ball ramp 164 extends deeper into plate 158 in a counter-clockwise direction. Therefore, as the central plate is rotated counter-clockwise, the balls move to shallower portions of the ramps to push plates 152 and 156 away from the central plate, axially expanding ball ramp assembly 150. This expansion moves the sliding sleeve to the right as shown in FIG. 3, for example, to compress the resilient element and engage the axle disconnect clutch. When the central plate is rotated clockwise, the balls move into the deeper portion of the ball ramps and the resilient element forces the sliding sleeve to the left, moving the plates together and disengaging the axle disconnect clutch.

Ball ramp 154 includes indentation 172 for receiving ball 160. The ball ramp in plate 156 includes a similar indentation (not shown). Ball ramps in central plate 158 may also include indentations (not shown). Those indentations are arranged at a shallow end of the ball ramp to provide a detent that prevents the resilient element from rotating the plates backwards when a rotational force is removed from central plate 158. In other words, once engaged, the central plate must be rotated in the clockwise direction to move the balls out of the detents and disengage the axle disconnect clutch. Axially outer ramp plates 152 and 156 are rotationally fixed to housing 146 by teeth 174 and 176, respectively, and central plate 158 is rotatable relative to the housing. That is, the housing includes slots (not shown) in cylindrical portion 178 that mate with teeth 174 and 176 to prevent ramp plates 152 and 156 from rotating.

Axle disconnect clutch 100 includes electric motor 180 arranged to rotate the central plate to axially displace the sliding sleeve. The electric motor is fixed to the housing. Axle disconnect clutch 100 includes idler gear 182. The central plate includes outer gear 184 engaged with the idler gear and the electric motor includes pinion gear 186 engaged with the idler gear. The axle disconnect clutch is engaged when the electric motor rotates the central plate in a counter-clockwise direction (in FIG. 4), pushing the ramp plates away from the central plate, and disengaged when the electric motor rotates the central plate in a clockwise direction, as described above.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 Axle disconnect clutch
102 Axle shaft
104 Tulip
106 Constant
108 Sliding sleeve
110 Rolling elements
112 Output shaft
114 Inner spline (first)
116 Outer spline (first)
118 Axis
120 Inner spline (second)
122 Outer spline (second)
124 Undulating profile
126 Resilient element
128 Axial direction (first)
130 Axial direction (second)
132 Bearing (sliding sleeve and resilient element)
134 Stepped portion (sliding sleeve)
136 Nonferrous target
138 Cylindrical protrusion (target)
140 Bearing (axle shaft and tulip)
142 Seal (axle shaft to tulip)
144 Labyrinth seal (tulip to housing)
146 Housing
148 Bearing (axle shaft and housing)
150 Ball ramp assembly
152 Axially outer ramp plate (first)
154 Ball ramp (first)
156 Axially outer ramp plate (second)
158 Central plate
160 Ball (first)
162 Ball (second)
164 Ball ramp (fourth)
166 Ball guide (first)
168 Ball guide (second)
170 Apertures (ball guides)
172 Indentation
174 Tooth (first axially outer ramp plate)
176 Tooth (second axially outer ramp plate)
178 Cylindrical portion (housing)
180 Electric motor
182 Idler gear
184 Outer gear (central plate)
186 Pinion gear

What is claimed is:

1. An axle disconnect clutch, comprising:
an axle shaft;
a tulip for a constant velocity joint; and
a sliding sleeve comprising:
a first inner spline; and
a first outer spline, radially aligned with the first inner spline, wherein:
a one of the axle shaft or the tulip comprises a second inner spline, complementary to the first outer spline;
the other one of the axle shaft or the tulip comprises a second outer spline, complementary to the first inner spline;
the sliding sleeve is axially slidable along a one of the first inner spline or the first outer spline to engage the other of the first inner spline or the first outer spline with the second outer spline or the second inner spline, respectively, rotationally connecting the axle shaft and the tulip;
a resilient element, wherein:
the sliding sleeve is axially slidable in a first axial direction to rotationally connect the axle shaft and the tulip;
the resilient element is arranged to urge the sliding sleeve in a second axial direction, opposite the first axial direction, to rotationally disconnect the axle shaft and the tulip; and
a bearing disposed axially between the sliding sleeve and the resilient element.

2. The axle disconnect clutch of claim 1 wherein:
the sliding sleeve comprises an undulating profile; and
a number of inner spline teeth of the first inner spline is equal to a number of outer spline teeth of the first outer spline.

3. The axle disconnect clutch of claim 1 wherein the sliding sleeve comprises a stepped portion and the bearing is disposed on a radially outer side of the stepped portion.

4. The axle disconnect clutch of claim 3 further comprising a nonferrous target for a proximity sensor with a cylindrical protrusion arranged on a radially inner side of the stepped portion.

5. The axle disconnect clutch of claim 4 further comprising a bearing disposed radially between the axle shaft and the tulip such that the tulip is supported on the axle shaft.

6. The axle disconnect clutch of claim 5 further comprising a seal that seals the axle shaft to the tulip.

7. The axle disconnect clutch of claim 1 further comprising:

a housing; and a bearing disposed radially between the axle shaft and the housing.

8. The axle disconnect clutch of claim 1 further comprising a ball ramp assembly for axially sliding the sliding sleeve in a first axial direction to rotationally connect the axle shaft and the tulip.

9. The axle disconnect clutch of claim 8 wherein the ball ramp assembly comprises:

a first axially outer ramp plate comprising a first ball ramp;

a second axially outer ramp plate comprising a second ball ramp;

a central plate comprising a third ball ramp facing the first ball ramp and a fourth ball ramp facing the second ball ramp;

a first ball displaceable along a first channel formed by the first ball ramp and the third ball ramp; and a second ball displaceable along a second channel formed by the second ball ramp and the fourth ball ramp.

10. The axle disconnect clutch of claim 9 further comprising:

a first ball guide disposed axially between the first axially outer ramp plate and the central plate; and a second ball guide disposed axially between the second axially outer ramp plate and the central plate.

11. The axle disconnect clutch of claim 9 wherein at least one of the first ball ramp, the second ball ramp, the third ball ramp or the fourth ball ramp comprises an indentation at an end of the respective ball ramp for receiving the first ball or the second ball.

12. The axle disconnect clutch of claim 9 further comprising a housing, wherein:

each of the first axially outer ramp plate and the second axially outer ramp plate is rotationally fixed to the housing; and the central plate is rotatable relative to the housing.

13. The axle disconnect clutch of claim 12 further comprising an electric motor arranged to rotate the central plate to axially displace the sliding sleeve.

14. The axle disconnect clutch of claim 13 wherein the electric motor is fixed to the housing.

15. The axle disconnect clutch of claim 13 further comprising an idler gear, wherein:

the central plate comprises an outer gear engaged with the idler gear; and the electric motor comprises a pinion gear engaged with the idler gear.

* * * * *